April 1, 1947.    N. L. DAHLANDER    2,418,111
PIVOTALLY MOUNTED SAFETY HOOK
Filed Feb. 7, 1945
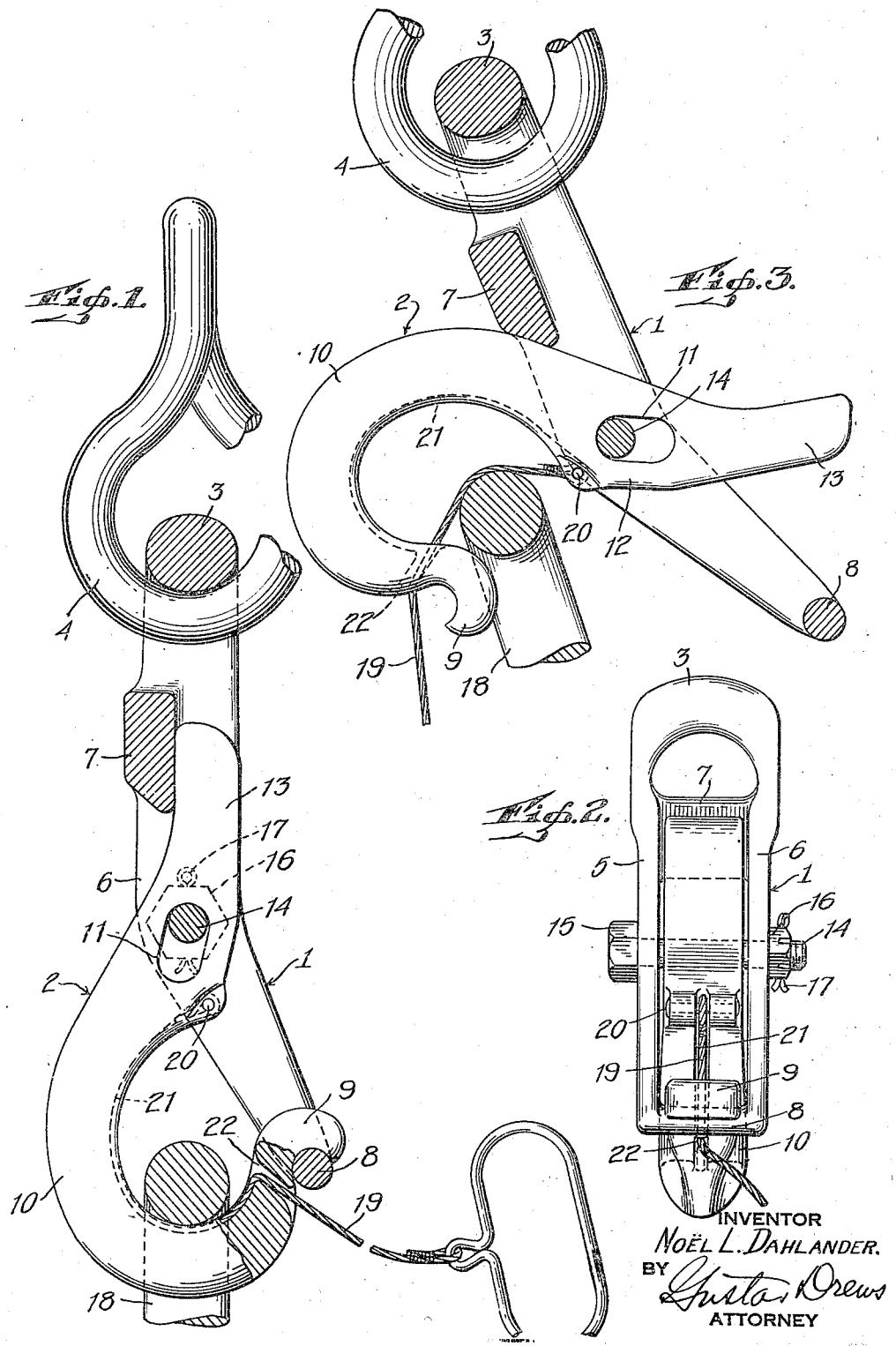
INVENTOR
NOËL L. DAHLANDER.
BY Gustav Drews
ATTORNEY

UNITED STATES PATENT OFFICE 2,418,111

PIVOTALLY MOUNTED SAFETY HOOK

Noel L. Dahlander, New Milford, Pa., assignor of one-half to Robert J. Earl, Deerfield Beach, Fla.

Application February 7, 1945, Serial No. 576,661

5 Claims. (Cl. 24—230.5)

This invention relates to safety hooks in general and more especially to safety tackle hooks secured to the ends of cables and the like for engaging rings associated with cargo nets or the like for supporting cargo when loading or unloading a vessel or the like, or for moving heavy articles on a construction job or in a manufacturing plant.

Among the objects of the present invention it is aimed to provide an improved safety hook which is pivotally mounted on a pin and which is provided with means for maintaining the hook closed or in supporting position even when the supporting pin is sheared.

It is still another object of the present invention to provide an improved safety hook of the type in which the hook is pivotally mounted which is provided with means whereby the hook may be readily relieved from its load when desired.

These and other features, capabilities and advantages of the invention will appear from the subjoined detail description of one specific embodiment thereof illustrated in the accompanying drawings in which Figure 1 is a side elevation partly in section of a safety hook made according to the present invention in closed or cargo supporting position.

Fig. 2 is a front elevation of the safety hook on a smaller scale than that illustrated in Figure 1.

Fig. 3 is a side elevation partly in section of the safety hook shown in open position and on the scale illustrated in Fig. 1.

The safety hook constituting the present invention consists essentially of a clevis 1 and a hook element 2. The clevis 1 in the present instance has a cross piece 3 at its upper end to receive the link 4 of a chain or to receive any other suitable ring at the end of a cable or the like. From the cross piece 3 the clevis has two parallel arms 5 and 6 with an intermediate transversely extending cross piece 7 disposed below the cross piece 3 and connecting the two arms 5 and 6 to one another. At the lower end of the clevis 1, the two arms are connected to one another by the transversely extending bar 8, in the present instance shown cylindrical in cross section, but in any event preferably having an upper arcuate surface to receive the finger 9 of the hook 2, the finger 9 being formed at the extremity of the claw portion 10 of the hook 2 and, the claw portion having an elongated slot 11 formed in its enlargement 12 at the upper end of its claw portion 10. The hook element 2 furthermore is provided with an extension or shank 13 extending beyond the enlargement 12 and forming an abutment for the transversely extending cross piece 7 as shown in Fig. 1. The elongated slot 11, as shown in Figs. 1 and 3, is adapted to receive the pin 14 extending through the arms 5 and 6. If the pin 14 is part of a nut and bolt as shown in Fig. 2, the head 15 of the bolt may rest against the arm 5 and the nut 16 secured to the other end of the pin 14 and provided with any suitable fastening means such as the cotter pin 17.

With the parts of the safety hook so far described, it will be seen that in the closed position, see Fig. 1, the extension 13 will rest against the cross piece 7, the upper end of the slot 11 will rest on the pin 14, and the finger 9 will rest on the cross arm 8. From the foregoing, it will appear that if the pin 14 should shear, the hook 2 would nevertheless remain in position, if a load were supported by the claw 10, assuming the load to be secured to the ring 18 shown supported by the claw 10.

In turn, however, as is customary when the load secured to the ring 18 was swung over to the position where it was to be unloaded, the cable including the ring 4 is slacked when the safety hook 2 will drop down and if it bumps against the cargo it may move upwardly due to the clearance in the slot 11 into position where the finger 9 may clear the arm 8.

Thereupon, the hook element 2 may be swung into the position shown in Fig. 3 to clear the ring 18 secured to the load.

In some instances, however, difficulty has been encountered in freeing the hook element 2 from the ring 18. For this purpose, the hook element 2 is equipped with a lanyard 19. This lanyard is preferably secured to the shoulder of the enlargement 12 at 20 as indicated, and the claw 10 of the hook element 2 is provided with a recess 21 deep enough fully to receive the lanyard 19. Furthermore, this recess 21 is in communication with the opening 22 adjacent to the finger 9. In use the lanyard 19 rests in the recess 21 and extends out through the opening 22 to the operator of the hoisting machine including the safety hook. When the finger 9 of the claw 10 engages the arm 8 and the claw 10 in such position supports the ring 18 of the load, the lanyard 19 will clear the ring 18 and lie slack within the recess 21. When the load, however, has been swung into a position of rest where the hook 2 may be removed from the same, the cable including the ring 4 is first slacked so that the claw 10 may ride upwardly relative to the pin 14 and then if the ring 18 did not immediately drop out of the claw 10 or clear the claw 10, a pulling force exercised on the lanyard 19 would quickly thrust it outwardly to clear the finger 9 as shown in Fig. 3.

These safety hooks are preferably composed of steel forgings, and dimensions of the several parts thereof are of course determined by the weight of the load customarily carried for a given job. In other words, if the particular hook was intended for use on a job that normally carried ten tons, its dimensions could of course be materially smaller than for a hook which was intended normally to carry a twenty-five ton load.

It is obvious that various changes and modifications may be made to the details of construction without departing from the general spirit of the invention as set forth in the appended claims.

I claim:

1. The combination of a clevis having parallel arms, a pivot pin supported by said arms, a cross arm at one end of said clevis, and a cross piece removed from said pin and extending from one parallel arm to the other; and a claw member having an elongated slot to receive said pin between said parallel arms. said claw having an extension in cooperative engagement with said cross piece and a finger in engagement with said cross arm when said claw is in closed position and said pin engages one end of said slot.

2. The combination of a clevis having parallel arms, a cross bar at one end to receive the ring of a supporting cable, a second cross bar at the other end, a pivot pin supported by said parallel arms, a cross piece extending from one parallel arm to the other and disposed between said first cross arm and said pin, and a hook element having a claw with an extension at one end of said claw and a finger at the other end of said claw, said hook element being provided with an elongated slot at the intersection of said extension and claw to receive said pin, the extension engaging said cross piece when said finger engages said second cross bar and said pin engages the upper end of said elongated slot, said slot being long enough to allow said finger to clear said second cross bar when said pin is spaced from the upper end of said slot.

3. The combination of a clevis having parallel arms with a cross bar at one end to receive a supporting cable, a second bar at its other end, a pivot pin supported by said parallel arms, a cross piece extending from one arm to the other between said first mentioned cross bar and said pin, a hook member having a claw with an extension at one end, and a finger at its other end, said hook member being provided with an elongated slot at the intersection between said extension and claw, there being a recess in alinement with the inner periphery of said claw and communicating with an opening adjacent said finger, and a lanyard connected to said hook member at the intersection between said extension and claw and extending through said opening cooperating with said recess to clear the connection of a load when the hook member is in load supporting position, and in position to eject the connection when said lanyard is pulled and the finger is released from said second cross bar.

4. The combination of a clevis having parallel arms, a pivot pin supported by said parallel arms and a cross bar at one end of said clevis and extending from one parallel arm to the other, a hook having a claw member, said hook being provided with an elongated slot at one end of said claw member to receive said pivot pin and a finger at the other end of said claw to engage said cross bar, abutting elements on the clevis and hook for relieving the pivot pin of the weight of the hook and any load carried thereby when the hook is in closed position, there being a recess in alinement with the inner periphery of said claw and an opening in said claw adjacent to said finger in communication with said recess, and a lanyard connected to said claw adjacent said elongated slot and extending through said opening cooperating with said recess to clear the connection of a load supported by said hook in load carrying position and serving to eject the connection when a pulling force is exercised on said lanyard and the finger of the claw is released from cross bar.

5. The combination of a clevis having parallel arms with a cross bar at one end to receive a supporting cable, a second bar at its other end, a pivot pin supported by said parallel arms, a cross piece extending from one arm to the other between said first mentioned cross bar and said pin, a hook member having a claw with an extension at one end, a finger at its other end, said hook member being provided with an elongated slot at the intersection between said extension and said claw, the extension engaging said cross piece when said finger engages said second cross bar and said pin engages the upper end of said elongated slot, said slot being long enough to allow said finger to clear said second cross bar when said pin is spaced from the upper end of said slot, there being a recess in alinement with the inner periphery of said claw and communicating with an opening adjacent said finger, and a lanyard connected to said hook member at the intersection between said extension and said claw and extending through said opening cooperating with said recess to clear the connection of a load when the hook member is in load supporting position and in position to eject the connection when said lanyard is pulled and the finger is released from said second cross bar.

NOEL L. DAHLANDER.

REFERENCES CITED

The following references are of record in the file of this patent:

UNITED STATES PATENTS

| Number | Name | Date |
|---|---|---|
| 2,359,557 | Hoffman | Oct. 3, 1944 |